Oct. 3 1967 R. THREADGOLD 3,345,618

PLURAL PROCESSORS-PLURAL TERMINAL DEVICES INTERCONNECTING SYSTEM

Filed May 27, 1964 7 Sheets-Sheet 1

INVENTOR:
RONALD THREADGOLD.
BY Irwin S. Thompson
ATTY.

INVENTOR:
RONALD THREADGOLD
BY Irwin S. Thompson
ATTY.

INVENTOR:
RONALD THREADGOLD
BY Irwin L. Thompson
ATTY.

INVENTOR:
RONALD THREADGOLD
BY Irwin S. Thompson
ATTY.

INVENTOR:
RONALD THREADGOLD
BY [signature]
ATTY.

INVENTOR:
RONALD THREADGOLD
BY Irwin A. Thompson
ATTY.

INVENTOR:
RONALD THREADGOLD
BY [signature]
ATTY.

United States Patent Office 3,345,618

Patented Oct. 3, 1967

3,345,618

PLURAL PROCESSORS-PLURAL TERMINAL DEVICES INTERCONNECTING SYSTEM

Ronald Threadgold, Liverpool, England, assignor to Automatic Telephone & Electric Company Limited, Liverpool, England, a British company Filed May 27, 1964, Ser. No. 370,623
Claims priority, application Great Britain, May 31, 1963, 21,877/63
18 Claims. (Cl. 340—172.5)

The present invention relates to data handling systems and is more particularly concerned with a system for allowing intercommunication between data handling devices.

In large data handling systems the physical distance between equipment units requiring association is of great significance with reference to signalling between units and the passing of information. This is particularly important in large computer systems where, to attain high speed operation, the computer is operated in pari passu mode. In such systems it is usual to use D.C. signalling of the form for example of 0 volt indicating a "0" condition and a voltage negative with respect to 0 volt as a "1" condition. The practical distance limit for signalling of this type is of the order of 40 yards and in large systems this is a great embarrassment.

Signals which are required to travel distances in excess of this limit must obviously be transmitted in pulse or A.C. form. In a completely parallel system this requires a very large amount of cable and, as expensive coaxial cable is required, a significant cost of the entire installation may be absorbed in cable alone.

It is therefore the object of the present invention to overcome the above mentioned difficulties by the provision of an "intercommunication" system allowing access between any one of a number of computers (or computer units) and any other computer (or computer units) or a piece of peripheral equipment.

According to one aspect of the invention, in a data processing system means responsive to first signals presented by any two or more of said data processing devices in the form of demands and indicating the priority allocation of the demanding processing devices, selectively effect an exclusive communication over a common communication path between the demanding processing device having the highest order of priority and one of said terminal equipments or any other one of said processing devices in accordance with second signals presented thereto by the demanding processing device having the highest order of priority.

According to another aspect of the invention, in a data processing system two or more common communication paths are provided individually for mutually exclusive communication between any one of said data processing devices and any one of said terminal equipments or any other one of said data processing devices and each data processing device includes means for presenting first signals in the form of a demand indicating the order of priority of the data processing device to a first control device provided in common to said communication paths and the control device in responding to first signals presented simultaneously thereto by two or more data processing devices causes one of a number of second control devices associated individually with said communication paths to be allocated for use by the demanding data processing device having the highest order of priority, said allocated second control device being arranged to respond to second signals presented thereto over part of its associated common communication path by the data processing device having the highest order of priority to generate control signals which enable said data processing device to be effectively connected exclusively over said communication path to any one of said terminal equipments or any other of said data processing devices as determined by said second signals.

According to a further aspect of the invention in a data processing system comprising a plurality of data processing devices adapted for exclusive connection to a smaller number of communication paths by the application of demand signal conditions to the associated ones of a plurality of leads which are arranged in a predetermined order of priority, a demand signal condition serving to change the potential applied to a lead from a first to a second value, the demand signal pattern on said leads is applied to first means which are effective in changing the demand signal pattern so that the potential on leads having lower priorities than the highest priority lead to which a potential of the second value is applied has the second value and the demand signal pattern obtained from said first means is then applied to a second means which restore the potential on all the leads except said highest priority lead to the first value, the demand signal pattern obtained from said second means being effective on equipment which enables the exclusive connection of the data processing device associated with said highest priority lead to one of said communication paths to be made.

The invention will be more readily understood from the following description which should be read in conjunction with the accompanying drawings. Of the drawings:

FIGS. 1*a* and 1*b*, forming FIG. 1 when placed side by side with FIG. 1*a* on the left, show a schematic diagram of the entire system.

The following description will be given in two separate sections the first explaining the entire system in broad terms, with reference to FIGURE 1 and the second explaining in detail the operation of the various equipments shown in FIG. 1 with reference to FIGS. 2 to 7.

The intercommunication system consists essentially of a data highway centre to which all computer units and peripheral equipments, between which intercommunication is required, have access via connection units. Each connection unit feeds a number of associated computer units and peripheral units forming a group, individual parallel interconnection paths being provided for each equipment unit. The size of the group is dependent upon the capabilities of the electronic circuits located in the connection unit, however, it will be assumed that a connection unit is capable of serving a group of twelve equipment units. The highway itself consists of two sets of conductors, one set, called "instruction conductors," being used to convey instructions to the "calling" and "called" equipment units to steer the data over the second set of conductors from or to the "called" equipment unit to or from the "demanding" or "calling" equipment. The control of the transmission of the data to and from the selected equipment units is performed by the data highway centre. The data is fed in parallel form from one of these selected equipment units via the connection unit to a convergence unit over the highway to two-divergence units and thence to all connection units. The required equipment unit, to which the data is to be transmitted, is selected by the parallel fed instructions on the instruction conductors.

The size of such a system is limited by the inter-unit cabling requirements and it will be assumed that the system to be described is provided with ten connection units, thus a total of 120 equipments may be served by the system. In certain cases the high rate of use of the highway warrants the introduction of additional highways with their associated control equipment. In the system to be described it is assumed that up to three data highway centres may be provided, this number being defined by the handling capacity of the highway channel allocater.

Figure 1A:
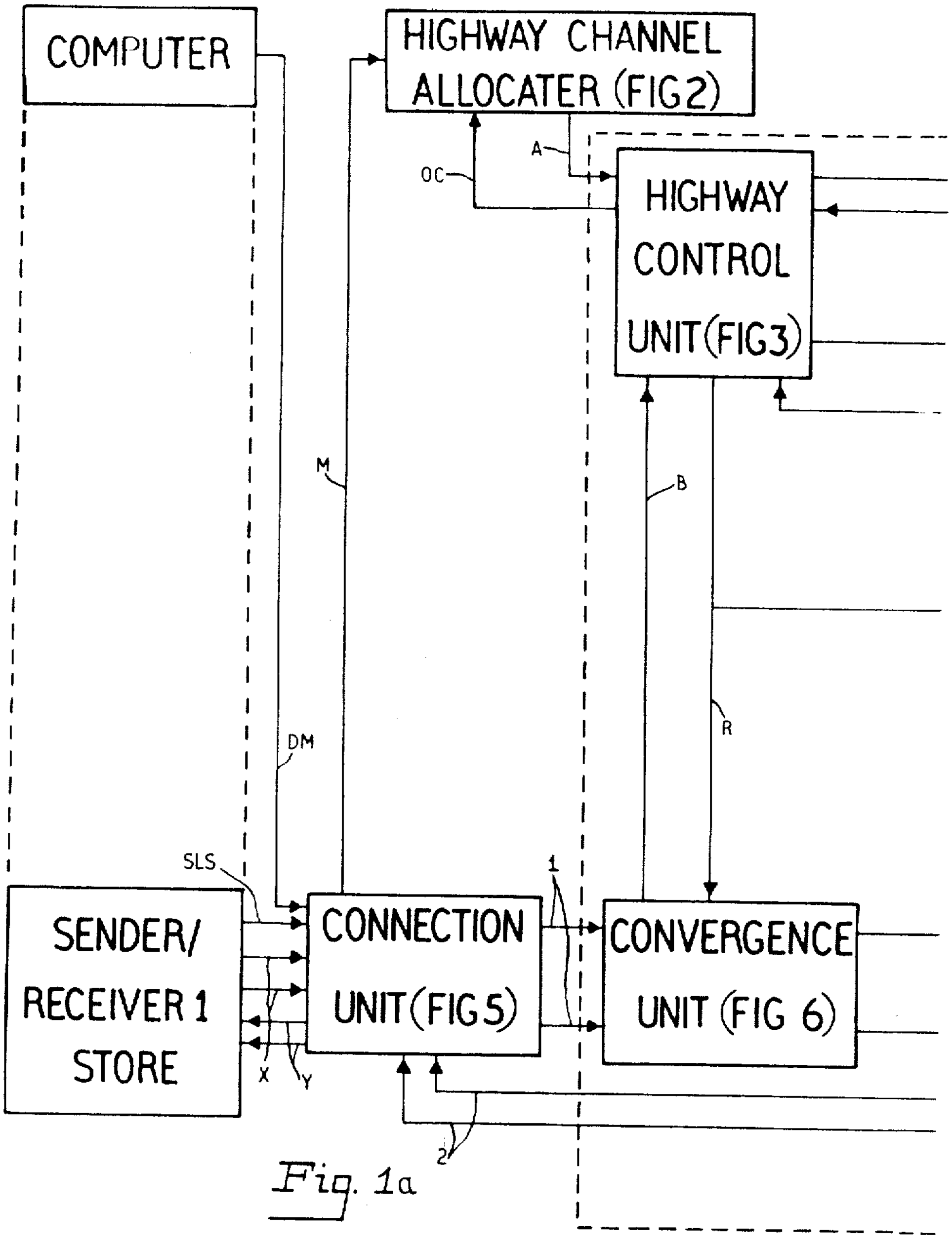
Figure 1B:
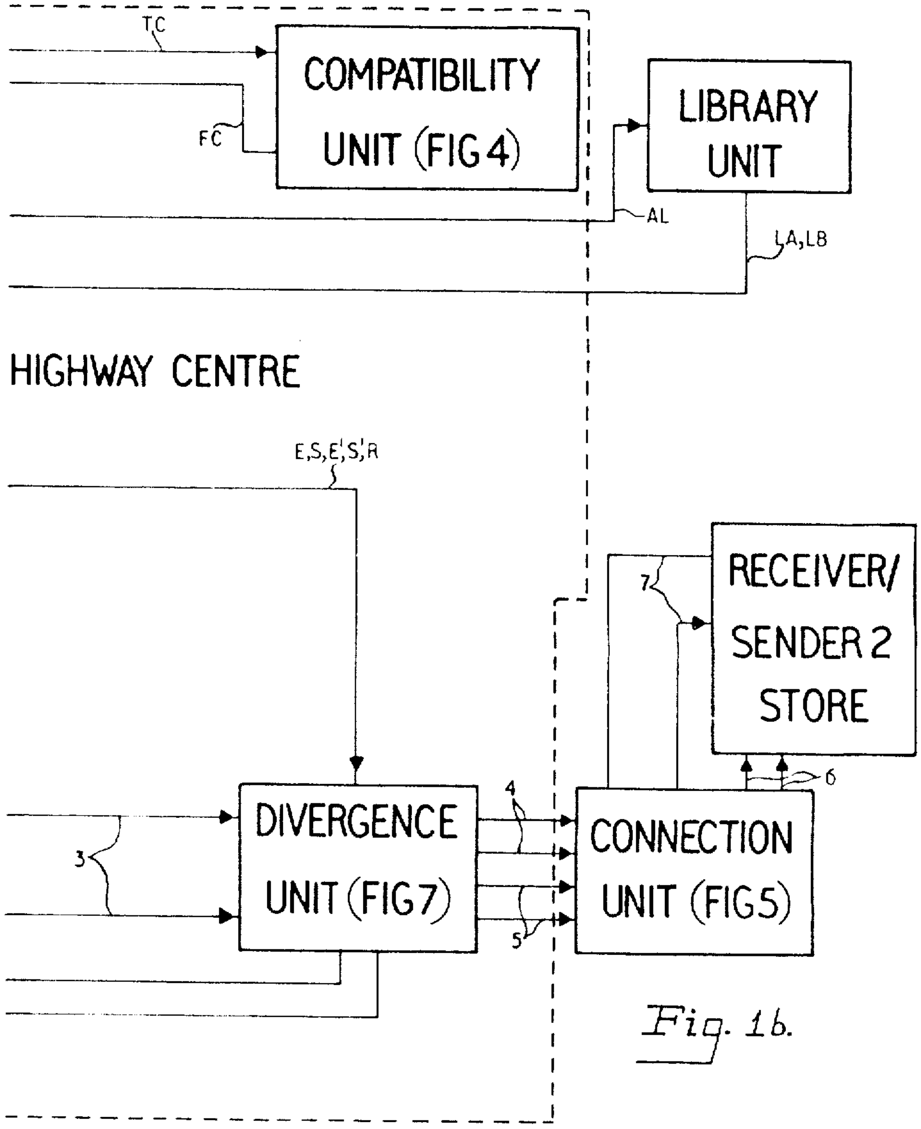

With reference to FIGURE 1 the operation of the system will now be described assuming that a computer unit (later referred to as programmer) requires access to a main storage unit (e.g. magnetic core matrix arrangement) which is common to a number of computers. FIGURES 1*a* and 1*b*, forming FIGURE 1, show the system arranged such that the original demanding or calling programmer requires to transfer data from its own local store to an other equipment store defined as the receiver.

When the programmer requires reference to another equipment (e.g. the main system storage unit) a "message order," formed in the arithmetic unit of the programmer, is written into a particular location in the computer local store (store location X).

*Message order*

The message order always conforms to the following pattern forming a 36 bit binary coded word which is divided into nine four-bit sub-sections.

| | |
|---|---|
| Bits **1–3** | Not used. |
| Bit **4** | Allocation fault (AF). |
| Bits **5–12** | Other equipment code (OE). |
| Bits **13–20** | Other section code (OS). |
| Bits **21–28** | Programmer section code (PS). |
| Bits **29–36** | Library section code (LS). |

Bit 4, the allocation fault bit, is made one if it is detected that the allocater has routed the calling computer's number into more than one highway control. The AF bit is made one by forcing all one's into the first 4 bit subsection (bits 1–4) of the message order when the fault condition is sensed.

Bits 5 to 12 subsections 2 and 3, the OE code, are the bits which signify the equipment in the message other than the programmer in control. This code is formed by using the four most significant bits of the eight bit code to define the type of equipment (i.e. store, computer etc.) while the four least significant bits are used to define one of a group of equipments in the specified type. Obviously in this example a total of sixteen equipments may be specified within the type category. It should be noted that the actual OE code used by the message order must be formed with reference to the serviceability of the actual equipment called for and the code formed initially by the calling computer may be modified to accommodate any change of equipment within the system (i.e. introduction of standby equipment). Thus when the "required" OE code has been formed within the message order this code may be used to address a "serviceability library" (not shown on FIGURE 1) to derive the "actual" OE code.

Bits 13–20 subsections 4 and 5, the OS code, are the bits which signify the most significant eight bits of a 10 bit code defining the required store section location in the "called" equipment. This OS code contains the number of the type of equipment within the "called" equipment and the number of the individual equipment to be used. For example if the OE code specifies a storage equipment, the OS code will define the type of store within that storage equipment, by the code contained in the most significant bits of the OS code, and the number of the individual store location required, defined by the least significant bits of the OS code.

Bits 21–28 subsections 6 and 7, the PS code, are the eight most significant bits of the 10 bit code which defines the section location in the calling computer.

Bits 29–36 subsections 8 and 9, the LS code, are the bits which indicate the message length, the three least significant bits, and the highway library address. The information stored in the highway library at that address is used to provide parts of the instructions required to steer the data message over the highway, and to indicate what sort of operation (i.e. read/write etc.) is required.

*The first action beat*

The entire highway system is controlled by a master clock system housed in the allocater unit and it is convenient for the following description to be subdivided under the clock beats.

When the transfer of the formed message order from the arithmetic unit accumulators to the computer's (programmer's) store location X is complete, the internal operation of the programmer is stopped and a "demand" signal is extended over a lead DM individual to the demanding programmer. This demand signal is presented to the highway channel allocater via the connection unit, which serves the group of equipments within which the demanding programmer is situated, over one lead such as that shown as lead M. The lead M shown in FIGURE 1 is indicative of an individual programmer within a particular group of equipments associated with a particular connection unit. Each connection unit is able to serve up to three programmers and therefore up to thirty programmers may be fitted for each system. The thirty individual leads M for the thirty programmers all terminate at the input to the channel allocater. These leads M are arranged in order of priority and in effect may be used to form a thirty bit code indicating the demanding programmers number (PN). The demand signal from the associated connection unit is transmitted in pulse form and appears at the input to the channel allocater. Thus at any one time the pattern appearing at the input will indicate the calling programmers.

The highway channel allocater checks the pattern of the demand signals and sets the highest-priority demanding programmer's linear code number (i.e. one out of thirty code) into the highway control unit in the data highway centre. This programmer's number (PN) is used as the "allocate" signal over the required one of thirty leads A. The highway control unit then produces a "select" signal which is transmitted via the associated connection unit to the demanding programmer. The sensing of this select signal resets the demand signal condition in the demanding programmer.

*The second order beat*

During this time the highway control unit extends an SE instruction (sender equipment code) and an SS code instruction (sender section code). These instructions are defined by the highway control unit from the linear PN code from the channel allocater. The SE code is a twenty bit code consisting of two sections of eight bits (linearly coded) and one section of four bits (also linearly coded). The code called a multi-linear code is formed on a one out of eight or four basis for fault checking purposes and indicates the number of the equipment which is required to act as the sender. This SE code is extended over twenty leads E (shown along with leads, S, E′, S′ and R as one conductor in FIGURE 1) from the highway control unit to the divergence unit. The SE code instruction is then extended over the associated twenty instruction conductors in the instruction highway, shown diagrammatically in FIGURE 1, by conductors 2, to all connection units. The required sender equipment is selected by this code. The SS code instruction is in binary form and consists of an eight bit code. This code together with parity bits is extended via ten leads S (within the E, S, E′, S′ and R group of leads on FIGURE 1) to the divergence unit and thence over the instruction highway conductors 2 to the selected programmer via the associated connection unit. This SS code defines the store location X of the demanding programmer's local into which the message order has been written.

The SE and SS code instructions are extended at this time as the highway control unit requires to read the message order and, therefore, the demanding programmer must be defined as the sender and the highway control unit itself must be defined as the receiver. Thus no receiver selection instruction codes are extended at this time.

The above transmission of instructions from the highway control to the connection unit is all in parallel form and by means of A.C. or pulse form signalling. The instructions are distributed from the connection unit to the demanding programmer by means of local D.C. circuits shown as leads Y in FIGURE 1.

*The second action beat*

During this time period the D.C. signal-form message order is transmitted from the demanding or "calling" programmer to the highway control unit in parallel form (thirty-six bits plus parity bits) over leads B via the connection unit, each message data section, of 36 bits, is divided into nine subsections of four bits each and a parity bit is generated for each subsection. The input conductors, leads X, to the connection unit are gated by the D.C. "sender select" signal from the calling programmer over lead SLS and the output message order from the connection unit is transmitted in A.C. form. The message order is set into a local store in the highway control unit and the various bits in the thirty-six bit message order word are distributed as required. The message length is derived from the LS code and the highway library is addressed by this LS code over eight leads AL. The OE code is extended to the compatibility unit over eight leads TC. The compatibility unit checks this code against the OE codes present in all other highway control circuits by means of coincidence circuits. The compatibility unit may be individual to a highway control unit or may be common to all highway control units in the system. If the required equipment unit is in use and the message length counter for the particular data message transfer is set to a message length greater than 2 a reject signal is sent to the "calling" computer. If the message counter is set to 2 or less the highway control unit is made to wait. The figure of two message time slots corresponds to the time that is required to restore the message order to the calling computer. If the equipment unit specified by the OE code is not being used in another message or when the other highway control message counter returns to zero the highway control unit continues by producing a channel occupied signal over lead OC to the channel allocater circuit. The libary instruction is read into the highway control unit and the various code instructions required to steer the data message transfer are derived.

*The third order beat*

During this time period the various steering instructions, i.e. the SE, SS, RE (receiver equipment code), RS (receiver section code) and the RU (receiver subsection code) instructions, are extended over leads E, S, E', S' and R respectively to the divergence unit. The above coded instructions are derived from the PN, PS, OE and OS codes in conjunction with the library instructions. The library instruction, which will be described later, contains a direction bit used to define the direction of data transfer required. The steering codes are routed from the divergence unit according to this direction bit. The RE, RS, and RU codes are passed over the instruction conductors, such as those shown as leads 5, to all connection units. The SE and SS codes are extended from the divergence unit to all connection units over the instruction conductors shown as leads 2. The instruction conductors carry in parallel the instruction signals in A.C. form. The RE and SE instructions are in multi linear code and the RS, SS and RU instructions are in binary code. Finally the message length counter in the highway control unit is stepped back once and the message order is removed from the highway control unit store if the message length counter then holds zero.

*The third action beat*

The first section of the data message is transmitted through the highway from the sender equipment unit to the receiver equipment unit during this time period. The "calling" computer may be defined as either of these depending upon the required transfer of data. For example if the OE code specifies a magnetic core main storage device and the "calling" computer requires to read information from a particular store location within this main store then the main store will become the sender equipment unit and the "calling" computer the receiver equipment unit. The direction of transfer is defined by the highway library from the LS code and the RS, SS, RE and SE codes are routed from the registers holding the PN, PS, OE and OS codes accordingly. In the preparation of FIGURE 1 it has been assumed that the data message transfer is such that the demanding programmer requires to write into the other equipment store. Thus the demanding programmer is defined as the sender by the SE code and the information stored at the store location in sender/receiver store 1 given by the PS code in the message order (used as the SS code) is to be used as the message data to be transmitted over the highway to receive/sender store 2 which is defined as the receiver by the RE and RS codes. When the sender has been defined, data, in parallel form and employing D.C. signalling, is applied to leads X connecting the sender to a connection unit. The connection unit changes the signals from D.C. to A.C. (i.e. pulse signals) and amplifies and gates these data pulse signals onto the parallel highway data conductors leads 1. Parity bit generation for the data message if required is also carried out in the connection units.

The outputs of the connection unit are fed to a convergence unit over leads 1 which amplifies the data message pulse signals and connects them to the highway conductors leads 3. The data message is fed, by the highway, to two divergence units which again amplify the data message pulses and feed them to all connection circuits over leads 4. The data message is distributed in D.C. form to all receivers over leads 6 but only the required receiver equipment unit is selected by the RE code, and the RS and RU codes act in this receiver. Parity checks on data and code instructions are carried out at the connection unit.

*Fourth order beat*

The SE, SS, RE, RS, and RU codes are extended if the message length register in the highway control circuit is not zero and the next data message is transmitted in the next action beat. The process continues until the message length register becomes zero when all the message order toggles are reset. The data highway centre then handles the next demanding equipment unit and the original demanding programmer unit carries on with its computation.

*The details of the circuits within the system*

The following section of the description will deal with the make up of each unit within the random data highway system.

*The highway channel allocater unit*

Figure 2:
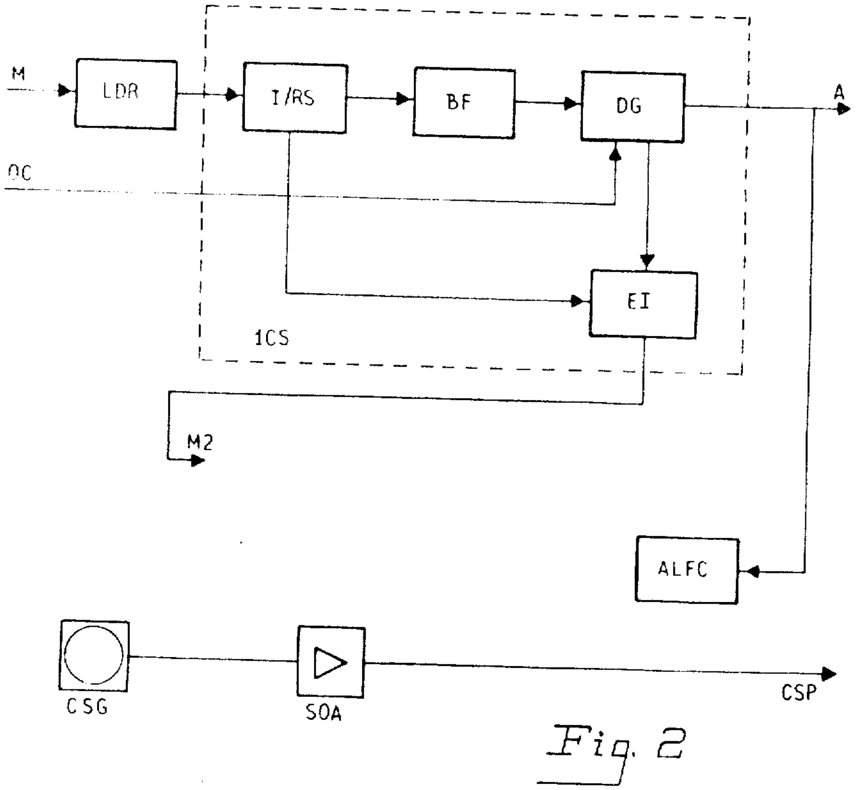
FIG. 2 shows a block schematic diagram of the highway channel allocator.

This unit is shown in FIGURE 2 and has the following main functions:

(a) To accept several channel demand signals, having predetermined priorities, and to allocate to the three highways in the system the three highest priority calling programmers.

(b) To transmit the equipment numbers (PN code) of the selected demanding or calling programmers to the highway control units associated with the allocated channels.

(c) To check that a channel is allocated to not more than one demanding or calling programmer.

With reference to FIGURE 2 it will be seen that the channel allocater unit carries two separate paths one for the reception of message demands from programmers and the other to produce strobe signals for the highway control units and the divergence circuits. The strobe circuit is used as the source of synchronisation pulses for the entire system and will be briefly described under a separate heading as it is of little significance as far as the invention is concerned.

The message demand path consists of a number of long distance receiving terminals LDR for the reception of the message demand signals from all programmers in the system. In practice thirty such long distance receiving terminals LDR are provided limiting the number of programmers used in the system to thirty when only one channel allocater is provided. The allocater is arranged to gain access to a maximum of three highway control units and, therefore, three highways. Each long distance receiving terminal LDR is fed from one programmer via its associated connection circuit, in A.C. signal (or pulse) form, over co-axial cables shown in the figure as leads M. Up to thirty such demands having predetermined priorities can be inspected. Any of these demands can be allocated to one of the three highways in the system and up to three demands (one for each highway in the system) can be allocated simultaneously. Thus when a number of message demand signals are received a message demand pattern is presented to the "first composite" stage 1CS, of which there are three (i.e. one for each highway), associated with highway one from the output of the long distance receiving terminals LDR. This pattern is arranged to have a most significant end and the priority allocated to each programmer in the system is defined by the number of "bits" the particular programmers demand signal is removed from the most significant bit of the message demand pattern word. For example, it has been stated that there are thirty programmers in the system thus there are thirty priority arrangements within the system. The programmer which is allocated the highest priority in the system is physically connected to the channel allocater such that its message demand signal forms the most significant bit of the message demand pattern word.

The input of the "first composite" stage 1CS consists of an inversion/reversion stage I/RS which is employed to convert the pulse output pattern from the long distance receiving terminal into inverse D.C. logic (i.e. "0"$=-V$ and "1"$=OV$). Thus a message demand pattern of inverse logic form is applied to the input of the next part of the composite stage. Taking a typical example the message demand pattern will be of the form 1101101 . . . 1 showing that two programmers require access to the system and those programmers have priority "positions" of three and six (priority 1 being the highest priority). The outputs from the inversion/reversion stage I/RS, which form the above pattern, and which are applied to the blanketing field BF, are arranged in three groups of eights and one group of six (i.e. 30 in all). The blanketing field includes 30 OR gates divided into three groups of eight and one group of six, corresponding to the outputs of the inversion/reversion stage I/RS. The outputs of the inversion/reversion stage are connected to the OR gates in the blanketing field by commoning the output representing the most significant bit of the message demand pattern word to the inputs of all the eight OR gates of the most significant group of the blanketing field. The output representing the next lower significant bit is commoned to the inputs of the second to eighth OR gate and so on. The second and subsequent groups of outlets are connected to the second and subsequent groups of OR gates respectively in the same way. Finally the OR gates of the second and subsequent groups each have an additional input which is derived either through an OR gate from the corresponding input of the preceding group or directly from the output of the gate circuit representing the least significant bit of the preceding group or groups. With this arrangement and bearing in mind that inverse D.C. logic is being employed, a "0" in a most significant position will pass through the corresponding OR gate and also through all OR gates corresponding to less significant bits. Thus following the example just given, the outputs from the blanketing field will be 1100000 . . . 0. The outputs from the blanketing field are each followed by an inverter so that the resulting demand pattern on the outputs of the inverters is given by 0011111 . . . 1. The first "one" in this pattern corresponds to the highest priority demanding programmer. The pattern as derived is now applied to the inputs of a differential gate stage DG.

The differential gate stage DG detects the "break-point" in the blanketing field output pattern and presents a linear code indicating the programmers number (PN) to the highway control, over leads A, as an "allocate" signal. The outputs of the differential gate DG is normally at the "1" level and the gate is so arranged that the effect of the break point is to insert a "0" in the corresponding output. Break points on lower priority leads are however ignored so that the allocate signal is of the form 1101111 . . . 1. The differential gate DG is also supplied with an inhibit signal called a "channel occupied" signal which is derived from the highway control unit over lead OC. This signal is used to cancel the allocate signal derived by the first composite stage 1CS of the allocater and allows the output from the inversion/reversion stage I/RS to be applied to the next composite stage of the allocater over leads M2. Thus, if we assume the message demand pattern stated above of 1101101 . . . 1, this pattern is now applied to the second composite stage as the highway associated with the first composite stage is either faulty or already in use.

Assuming that the "channel occupied" signal is not present and, therefore, the linear output from the differential gate DG is applied to the highway control as the "allocate" signal, the second demanding programmer must now be allocated. The linear code used as the allocate signal is also applied to an elimination inverter EI where it is compared with an output from the inversion/reversion stage I/RS. The allocate signal is of the form 1101111 . . . 1 and the output from the reversion/inversion stage I/RS is of the form 1101101 . . . 1. These two coded signals are compared and the "allocated" programmers number is removed from the demand pattern. The new demand pattern at the output of the elimination inverter stage EI will be of the form 1111101 . . . 1 where the "0" is indicated by a pulse over the sixth of thirty leads M2 to the next composite stage. The same functions will be performed on this new demand pattern by the second composite stage.

The "allocate" linear code signal is also applied to a fault checking circuit ALFC which is arranged to give a full indication if more than or less than one allocation has been made in each composite stage.

*The highway control unit*

Figure 3:
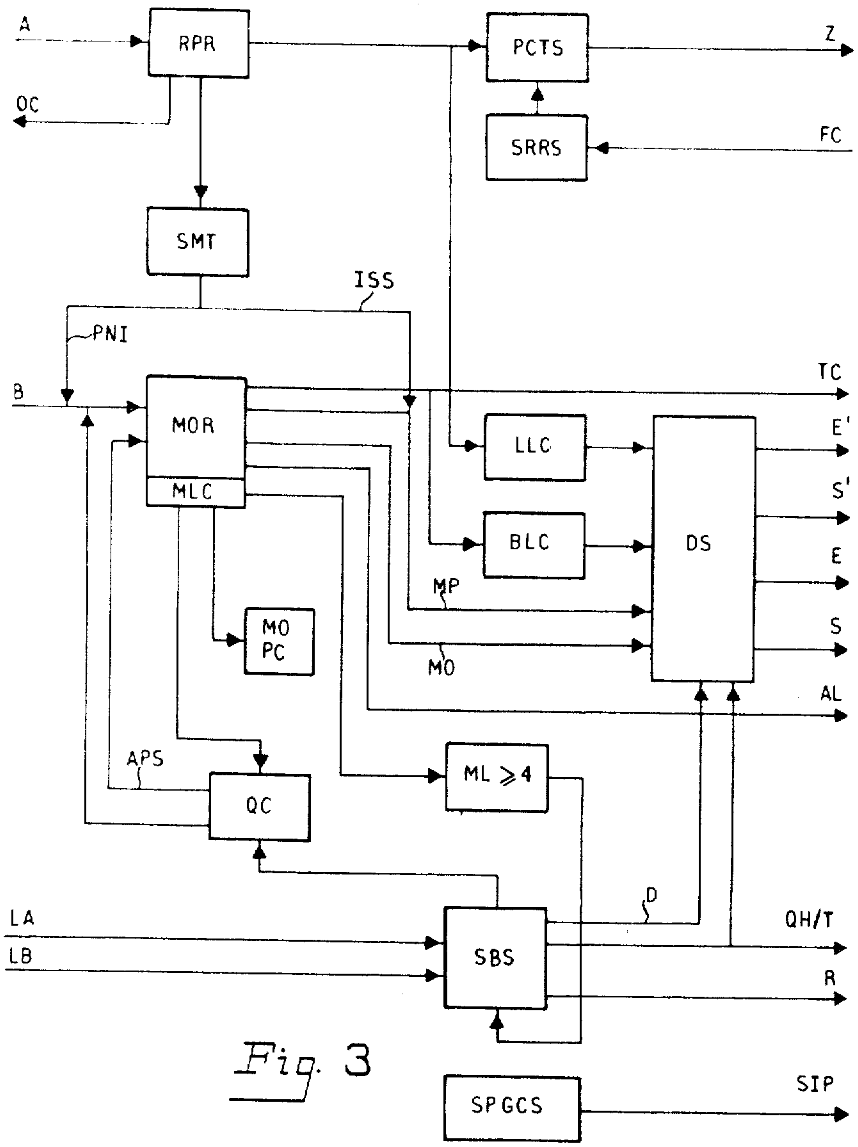
FIG. 3 shows a block schematic diagram of the highway control unit.

The unit is shown in FIGURE 3 and has the following functions:

(a) To store in linear form the programmer's number associated with a demand accepted by the channel allocator. The accepted programmer's number (PN) is signalled by the channel allocater on one of thirty leads.

(b) To forward a "select" signal to the accepted programmer.

(c) To forward a channel occupied signal to the channel allocater.

(d) To control transmission of the message order over the highway from the selected programmer to itself and store this message order.

(e) To address the highway library storing a number of 36 bit library instructions.

(h) To accept from the compatibility unit signals required to indicate incompatibility or compatibility.

(i) To reset the "message order store" if the demand proves incompatible.

(j) To direct the demanding programmer number (PN) to sender address leads (i.e. as the SE code) and the other equipment address (OE code) to receiver address leads (i.e. as the RE code) or vice-versa depending on the direction of message transfer required.

(k) To control normal messages on the highway by forwarding the address data (the RS, SS and RU codes) at predetermined times.

(l) To control special messages which extract work locations from or add to a queue in a miscellaneous store.

(m) To provide a message length counter which is to be stepped towards zero as each part of the message is transferred.

(n) To reset the message order store when the message count equals zero or when message end signal is renewed.

(o) To generate parity bits for the various instructions on the highway and compare them with locally generated parity bits.

(p) To check the linear portions of RE and SE instructions.

The operation of the highway control unit will now be described with reference to FIGURE 3. The "allocate" signal from the highway channel allocater consists of thirty leads A and their conditions indicate the number of the demanding programmer. This programmers number (PN) is stored by the record programmer register RPR. This register RPR may conveniently consist of thirty toggle circuits. One output of each toggle may be applied to an OR gate whose output is used to produce the "channel allocater" signal over lead OC to inhibit, for further use, the composite stage of the allocater which allocated the particular demanding programmer to the highway controlled by this highway control unit. This channel occupied signal is also used to set the special message toggle SMT which may consist of thirty toggle circuits. When the record programmer register toggles are set their outputs are also used to produce a "select" signal which is transmitted by a long distance transmission amplifier in the programmer control transmitter circuit PCTS. The select pulse is transmitted via the relevant one of thirty leads Z to the relevant connection unit associated with the demanding programmer in A.C. form.

The outputs of the record programmer register toggles are also applied to a linear-to-linear converter LLC which converts the demanding programmers numbers (PN) from a linear code (i.e. one out of $n$ where in this case $n=30$) into a multi linear code. The multi linear code output from this linear-to-linear converter LLC takes the following form: An output on one lead in each of two groups of eight and one group of four leads. The setting of the special message toggle SMT indicates to the various circuits in the highway control unit, which are responsible for the construction of the steering codes, that the next message to pass over the highway is the message order and for this message the demanding programmer is defined as the sender equipment (i.e. PN (linear)=SE (multi linear)) and the highway control message order register MOR the receiver equipment. The special message toggle SMT, when set, blocks all inputs from the library thus making the RE, RU and SS codes zero, and sets the three bit message length counter MLC to all ones. The above functions are all performed in the action beat period of the central clock and for the particular demand under consideration this is considered to be the first action beat period.

At the start of the "second" order beat period the SE, SS, RE, RS and RU codes are extended by the direction switch DS and subsection switch SBS, in D.C. form, to the divergence units over the multi-element leads E′ (the RE code), leads S′ (the RS code), leads E (the SE code), lead S (the SS code) and leads R (RU code). The SE code is the multi linear form of the linear "allocate" signal (i.e. the PN code) and all other codes are zero, due to the blocking action of the special message toggle SMT. However, the SS code (sender section code) is modified by the special message toggle to define the store location X in the demanding programmers local store which contains the message order. As stated previously a particular address in the local store of all programmers is kept for the message order and, therefore, the SS code produced at this time may be any value as long as this is a particular code which may be recognized by the demanding programmer as indicating the store location holding the message order. For example the special message toggle SMT is arranged to inject into the second bit of the SS code a "one" by means of lead ISS.

The above action initiates the transfer of the thirty-six bit message order from the demanding programmer store location X to the message order register MOR via the associated connection unit and the convergence unit, under the control of the special message toggle SMT and the control clock at the start of the second action beat period. Conveniently the message order register MOR may consist of thirty-six pulse set toggles. The OE, OS, PS and LS codes which make up the message order are read into the message order register MOR over thirty-six leads B in FIGURE 3. The message length counter MLC is set in accordance with the numerical value of the three least significant bits of the LS code.

The complete LS code is used to address the highway library over leads AL. The OE code is passed to the compatibility unit over leads TC to allow the compatibility unit to check the OE code against the OE codes being used on the other highways in the system. The compatibility unit will, therefore, establish whether the other equipment required for the message transfer is free. The OE code is also applied to the direction switch DS via a binary -to-linear converter MLC changing the OE code into a multi-linear code ready for its eventual use as an RE or SE code. The PS and OS codes are also extended to the direction switch DS via leads MP and leads MO respectively for use in forming the SS and RS codes.

The highway library instructions, stored at the address given by the LS code, are used to define the direction of the message transfer and to complete the make-up of the RS and SS codes as well as the store subsection RU code if required. The format of the library instructions must now be considered and therefore, it is advantageous to consider at this point the highway library in detail returning later to the rest of the highway control unit.

*The highway library*

This equipment may conveniently be a programmed magnetic core storage matrix of the type employing biasing magnets associated with storage cores in which an "0" is to be stored. The absence of a biasing magnet makes a storage core hold a "1" condition. The library is not shown in any of the accompanying figures as it is a conventional store and may easily be described purely in words only. The library has the following functions:

(a) To store up to 256 order words of 36 bits each.

(b) To allow the order words, containing additional information (in the form of instructions) for steering the data message transfer over the highway, to be selected by the LS code and the LS demand pulse.

(c) To "display" the selected order word (defined by the LS code address) on a thirty-six bit output register.

The operation of the library will now be discussed. The reading and re-writing operation is arranged to take one slot (i.e. one action beat period and one order beat period). During the action beat period (the second action beat period with reference to an allocated demand) the address of the required library section is supplied by the LS code over the eight input leads (shown as leads AL on FIGURE 3). These bits select the Y and X selectors for the switch core matrix, the selected core causing the required word to be interrogated. Simultaneously with the application of the LS code bits a demand pulse is applied which resets the toggles in the output register and triggers a timing control circuit. The instructions stored at the LS code selected address are read out and are stored on the toggles in the output register.

The initial library, address is, as has been mentioned previously, the LS code, the subsequent addresses are each one less in number and are defined by combining the message length count (reduced by one for each message passed over the highway) and the five most significant bits of the eight bit word forming the LS code.

To enable the eight bits available for the LS code to be more fully utilised a special selector (subsection switch) is used in the highway control. This switch detects when the message length counter is set to 011 or greater (i.e. when the counter is set to four or more). When this occurs the eighteen least significant bits of the library instruction are used to provide the "steering" instructions. Otherwise (i.e. when the message length counter is less than 4) the eighteen most significant bits are used. The format of the highway library instructions is as follows:

*The highway library instructions*

| | |
|---|---|
| Bits **1** and **19** | Q Control. |
| Bits **2** and **20** | Message end. |
| Bits **3** and **21** | Message direction. |
| Bits **4** to **6** and **22** to **24** | RS and SS (3L.S.D.) |
| Bits **7** to **9** and **25** to **27** | RU parity. |
| Bits **10** to **18** and **28** to **36** | RU or Subsection code (used for store instructions only). |

The above sections of the highway library instructions will be described with reference to the least significant half word, the bits of the most significant half word corresponding to the bits of the least significant half-word.

Bit 1, the Q control bit, is used to control the operation of a Q process. The highway control is used to steer the Queue control messages. These messages are required to prevent complex interlock subroutines between two programmers both trying to work the same queue. The use of the Q instruction will be explained later. If the Q control bit is 1 then the process of stepping the "fill" or "empty" Q count is required.

Bit 2, the message end bit, if 1, is used to conclude the message regardless of the message length counter.

Bit 3, the message direction bit, is used to define the directions of the message transfer. If this bit is a 1 then the "calling" programmer is the receiving equipment. Thus if it was required to read from a main store this bit would be a one in the relevant library address.

Bits 4 to 6 are the three least significant bits of the sender section or the receiver section depending upon the direction bit. This section of the library instruction is used to select the SS and RS codes.

Bits 7 to 9, RU parity code, are as their name implies used to provide a parity pattern for checking the distribution of the RU code.

Bits 10 to 18, subsection code, are the bits which indicate the subsections to be amended in the receiver equipments. These subsections are indicated by the 1's pattern in these nine bits.

The RU code instructions are only used when access to a magnetic core store is required for writing purposes. When it is required to amend information in the store at a particular address it is arranged that the amended information is fed into the rewrite paths for the store. Obviously only certain sub-sections of the store will require amending and the RU code is used to define these subsection.

*The rest of the highway control unit*

With reference once again to FIGURE 3 it will be seen that the library instructions are fed by leads LA and LB to the subsection switch SBS which is controlled by the message length staticiser ML≥4. This staticiser, which may be of a conventional toggle type of circuit, controls the extension of bits 1–18 or of bits 19–36 of the highway library instruction from the highway library. The various sections of the library instructions are distributed by the subsection switch SBS to control the direction of the message transfer and so on.

The direction bit and the three least significant bits of the RS and SS codes are extended over lead D from the subsection switch SBS to the direction switch DS. The direction switch senses the direction bit and arranges the distribution of the RS and SS codes accordingly. If the direction bit is a "one" then the "calling" programmer is the equipment to which the data message is to be transferred over the highway. In other words the calling programmer is the receiving equipment and the other equipment, defined from the OE code, is the sender. Thus, the RE and RS codes must be made to define the calling programmer and the SE and SS codes must be made to define the other equipment. An example of this is found when a computer requires to read from a main store. In this case the RE and RS codes will define the computer and the store location into which the information stored at a certain address, defined by the SS code, is to be transferred from the main store, defined by the SE code.

The subsection switch SBS also provides the RU code direct to the divergence and convergence circuits over leads R. The Q control signal is also extended via lead Q to the Q control equipment QC and this will be explained later.

The OE code extended previously over leads TC by the message order register MOR, is checked by the compatibility circuits, and if the equipment indicated by the OE code is being used on another highway but the "blocking" message has less than three slots to go, the highway control unit is held until this message is completed.

The above actions are all completed in the second action beat period.

If the "blocking" message on another highway has more than two slots to be completed, the highway control is reset and a "reject" signal is extended from the compatibility unit, via the select/reject circuit SRRS and the control pulse transmitter circuits PCTS in the control unit, to the "calling" computer via the connection unit, over lead Z. The timing of the pulse sent to the programmer warns it of the compatibility of the OE code in the message. Re-demand pulses may also be extended over lead Z from the select/reject circuit SRRS in the control unit if either the highway or the other equipment has failed or is out of service.

If the message is allowed to proceed after the compatibility checks have been completed, the SE, SS, RE, RS and RU instructions are extended by the direction switch DS and the subsections switch SBS.

The message length counter MLC is stepped over once and the message order toggles in the message order register MOR are reset if the message length counter now contains zero.

The above actions are all completed in the third order beat period.

The SE, SS, RS, and RU codes will be extended in each subsequent order beat period and each section of the data message will be transferred over the highway in the following action beat period until the message length counter contains zero.

*Q control circuits*

It was mentioned previously that the highway control unit contained the equipment for steering the Queue control messages. This is not an essential part of the control unit, however, it is convenient to show how such a Queue control arrangement may be provided.

The Queue function is required when the flow of work to certain items (e.g. data links, operators, programmers etc.) is such that the work location must be queued until the item is able to deal with the next work location. The queue in this particular arrangement of control unit is stored in a miscellaneous store. This store consists of eight locations arranged as shown below.

*Data arrangement of queue*

| | Subsections | | | | | | | |
|---|---|---|---|---|---|---|---|---|
| 9 | 8 | 7 | 6 | 5 | 4 | 3 | 2 | 1 |
| Fill | Q Control | | 1st | Q word | 5th | Q word | Section 1 | |
| Empty | Q Control | | 2nd | Q word | 6th | Q word | Section 2 | |
| | | | 3rd | Q word | 7th | Q word | Section 3 | |
| | | | 4th | Q word | 8th | Q word | Section 4 | |

Two operations may be performed on the queue and these are (a) Fill queue and (b) Empty queue.

The programmer does not know the "Head" or the "Tail" number of the queue when access is required to the queue and therefore the first operation must be to obtain this from the Q store. This is done by the LS code in the message order (2 possible codes one indicating "fill" and the other "empty"). Either of these LS codes obtains the 3 control bit (bit 1 or 19). This bit in the highway library instructions is a one for both the queue manipulations. The queue control bit causes the LS code to be overwritten for the next word thus allowing this code to select the location in the miscellaneous store holding the current head or tail of the queue. The first operation also routes the data in the revelant miscellaneous store location to the programmer. This is an automatic arrangement, however, no information is lost as the crucial locations are eliminated at the convergence circuit.

The second slot of the message is used to transfer the number at the tail of the queue to the programmer (if the message is a fill Q, the empty head of the Q number will be transferred).

The third slot either amends the new head of the queue or cancels the old tail of the queue. Since the programmer does not know where these are, it must have set up all possible miscellaneous store locations in its own store prior to the message, with work location if a fill Q is required or all 0's if an empty Q is required.

Previously the number at the tail of the queue was transferred to the programmer in the previous slot, however, action must be taken to ensure that the cancellation data is not destroyed. To prevent this, arrangements are made to change the PS code before the third slot. This is achieved by a setting a "one" into bit 24 of the message order in the message order register MOR over lead APS by the Q control circuit QC, see FIGURE 3.

The fourth slot is used to amend the Q control number (step the head or tail of the queue). This can only be done in the empty Q case if there is a further number to be emptied from the queue (at the start of the message). The queue control circuit QC examines the old tail of queue data during the second slot to determine this, a local staticiser holds the result until the fourth slot.

Various comments have been made on the Message order, the Library instructions and the Highway instructions to control the data message transfer. The following table shows the use of these instructions and their relationship to each other.

*The relationship between the message order, the library instructions, and the highway instructions*

| Message Order | Library Instructions | Highway Instructions |
|---|---|---|
| OE code (Bits 5 to 12). | | Becomes either SE code or RE code depending on "direction" of data message. |
| OS code (Bits 13 to 20). | | Becomes either SS code or RS code depending on "direction" of data message. |
| PS code (Bits 21 to 28). | | Becomes either RS code or SS code depending on "direction" of data message. |
| LS code (Bits 29-36). | Selects the first in the sequence of library instructions (the no of instrs depending on message length) Subsection (Bits 10-18 or 28 to 36) 3 LSD of SS&RS codes (Bits 4 to 6 or 22 to 24) Direction; defined from codes indicating the type of operation (e.g. read or write from or to the main store). (Bit 3 or 21). | RU code merged with and selects either SS code or RS code. |
| Allocation of Programmer to Highway control. | RU parity, Message end, Q control—Used for checking and supervisory. | Becomes either RE code or SE code. |

*The compatibility unit*

Figure 4:
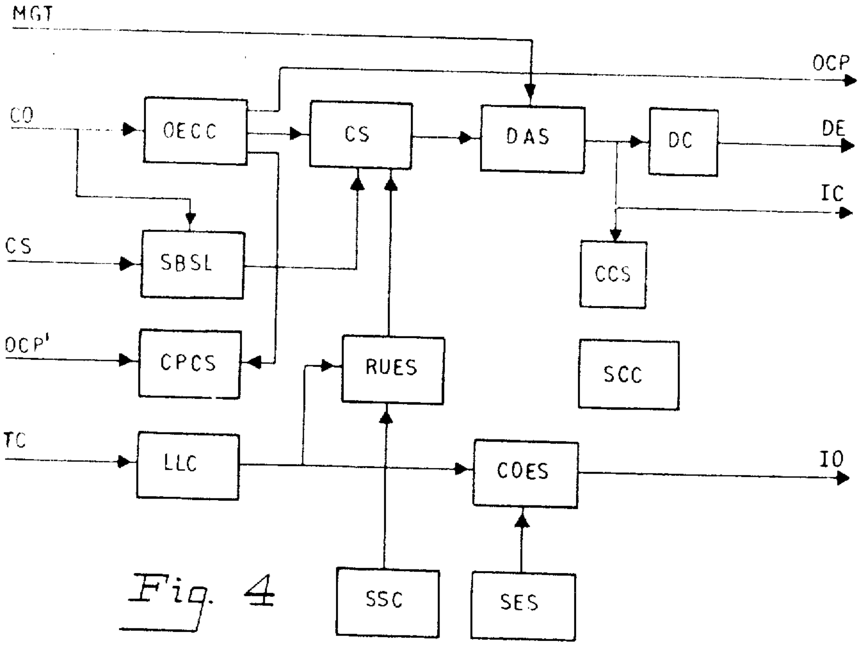
FIG. 4 shows a block schematic diagram of the compatibility unit.

This unit, shown in FIGURE 4, has the following functions:

(a) To produce a "demand incompatible" indication if the "called" equipment address, given by the OE code, is coincident with the OE address being used either in an established demand on any of the other highways in the system or in a provisionally accepted demand on a more prior highway in the system. Or if the OE address indicates an equipment which is out of service and has not been allocated a standby equipment.

(b) To produce a "standby equipment" indication if the OE address indicates an equipment which has been placed on standby or when a standby is being used in place of the equipment indicated by the OE code.

(c) To produce a signal to inhibit demands on the associated highway when for example the contents of the address of the main store defined by the OE code are being renewed.

The compatibility unit, which may be provided on an individual basis for each highway or may be provided for use by all highway systems, also includes fault detection and recording equipment. This fault equipment, however, is not a feature of the invention and will not, therefore, be treated in any great detail.

The equipment required to perform the above functions will now be described with reference to FIGURE 4. The compatibility unit is taken into use during the setting up period of message demands to the associated highway control unit. When the message order is set up in the highway control the OE code is extended to the compatibility unit via leads TC. The multi-linear OE code from the highway control is converted into linear code by linear-to-linear converter LLC and applied to a reject selector RUES. This reject selector is fed with information from a serviceability status circuit SSC which is fed by informaiton stored outside the highway system in a serviceability store, indicating which equipments are out of service. If it is found that the equipment specified by the OE code is out of service and not replaced by a stand-by equipment then a demand incompatible signal is produced by the reject selector RUES. This signal is extended to the compatible selectors CS and a signal at a specified time, controlled by the master clock, is given to the highway control unit over lead IC. This causes the "reject" signal to be produced by the highway control and the message order toggles in this equipment are reset.

The linear OE code is also applied to the change OE code selector COES. This selector is fed with information from the serviceability store and this information indicates the equipments which have been replaced by stand-by equipments. If coincidence is found between the OE code and the serviceability information by this change OE code selector COES, a signal is given to the highway control over lead IO to cause a "one" to be injected into the most significant digit of the OE code. This causes the OE address to be recorded to the stand-by equipment code.

If neither of the above conditions arise the OE code is presented to the compatible selectors CS. Two of these selectors are provided worked in parallel for fault security purposes. This selector is also fed by two further inputs. One of these inputs is from an OE coincidence circuit OECC.

Two OE coincidence selectors, in the OE coincidence circuit OECC, compare the OE address signals from the associated highway control units in the system on leads CO. The OE address consists of an 8 bit binary code and the coincidence circuit compares both the normal and the inverted functions of the signals to be compared. Both of these OE address forms are sent from the associated highway control units and are amplified before being applied to the coincidence circuit OECC. To ensure a fast transmission time, only the inverted (or "not") function of the OE address signals from the other highway control units is provided and inverters are supplied in the coincidence circuits OECC to generate the normal function.

The equipment coincidence signal is produced if the OE address from the associated highway control is identical to the address from another highway control unit. If the latter highway is out of service the appropriate OE address signal is suppressed.

The OE address coincidence signal is checked in the coincidence checking selector CPCS against the OE coincidence patterns from the other compatibility units on leads $OCP^1$. Leads OCP are the leads which carry the OE coincidence pattern for the compatibility unit under consideration.

The OE on leads CO are also applied to a store busy selector SBSL. This selector is fed by the current store inputs from the synchroniser (not shown in the drawings). This is to prevent a store which may be being used externally to the highway system from being taken into use by the OE code. The output of the store busy selector SBSL is fed to the compatible selector CS.

The compatible selector CS is used to determine if, when coincidence is detected in the OE coincidence circuit OECC, the coincidence is between simultaneous demands on two or more highways for the same other equipment and if so which "calling" programmer has the highest priority. In the event of a coincidence signal a highway incompatible signal is always produced on lead IC at a particular clock controlled time within the lower priority highway control irrespective of whether the demand is established. This incompatible signal causes the reject signal to be transmitted to the calling programmer and the message order staticisers to be reset.

The "demand compatible" signal is produced at the output of the compatible selector CS and this is fed to a demand accept selector DAS. This demand compatible signal is gated with all the message length 2 signals on lead MGT to delay the production of a "demand established" signal in the delay circuit DC, when the required other equipment is already in use but the message length counter associated with the blocking transfer is set to less than 2.

When the blocking transfer is completed or when the demand compatible signal is produced the clock controls the timing of the demand established signal to all highway control units. Until this signal is produced the output from the demand accept selector DAS is stored.

The compatible selector CS, the demand accept selector DAS, the delay circuit DC and the store busy selectors SBSL are provided on a duplicated basis and the outputs of both sets of equipment are compared in the compatible checking selector CCS for fault location means. A strobe checking circuit SCC is also provided in the compatibility unit.

*The connection unit*

Figure 5:
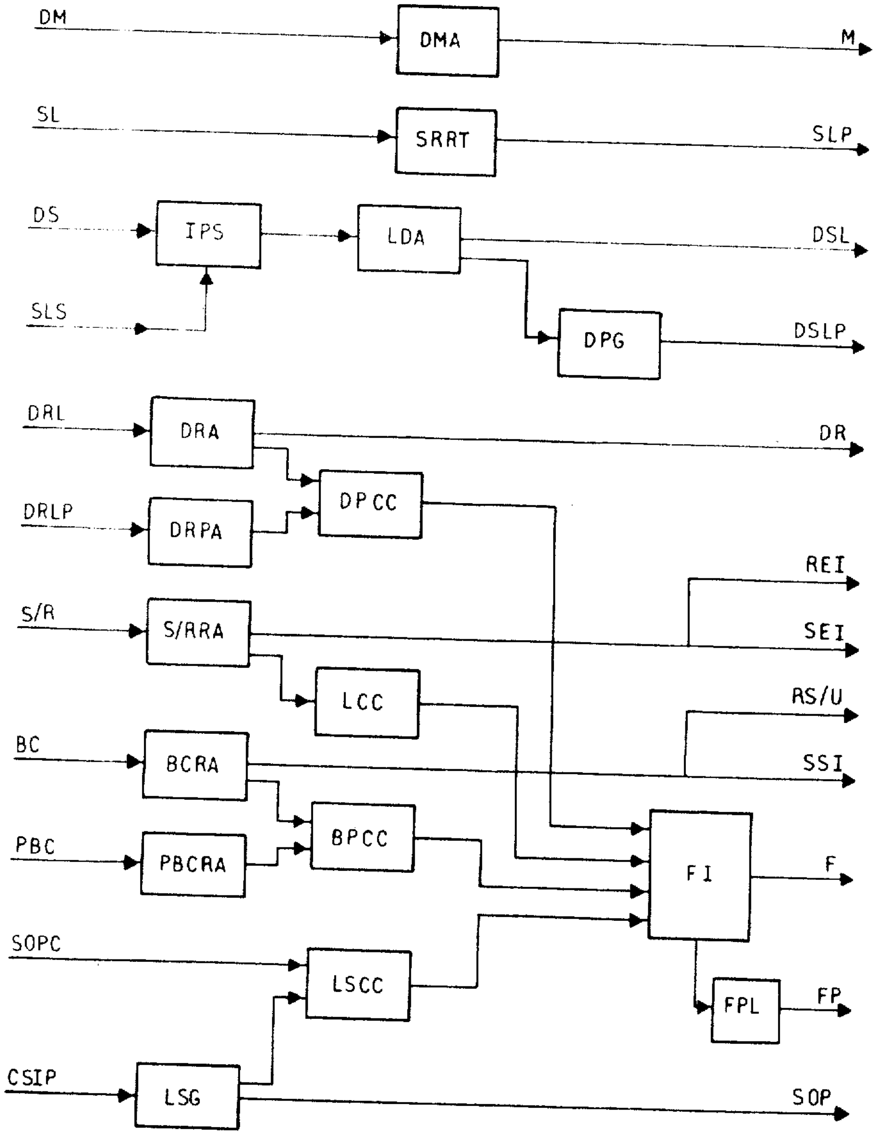
FIG. 5 shows a block schematic diagram of the connection unit.

This unit is shown in FIGURE 5 and one such unit is provided for up to 12 equipments in the data highway system. The unit has the following functions:

(a) To provide gates for switching the data outputs from up to twelve equipments on to a "sending highway."

(b) To provide long distance signalling terminals for sending and receiving information on the highways.

(c) To amplify the message data and certain instruction data from the "receiving" highway for distribution to the associated equipments (i.e. programmers, stores etc.).

(d) To generate parity bits for outgoing data.

(e) To check, when acting as the receiving connection unit, for faults on data leads and instruction leads from the highway.

(f) To receive programmer "message demand" signals in D.C. form and to convert them for transmission to the highway channel allocator unit.

(g) To receive programmer "allocate/redemand" signals and distribute these signals to the required "calling" programmer.

The equipment required to perform the above functions will now be described with reference to FIGURE 5 in order of operation.

When a programmer requires access to another equipment in the highway system it extends a message demand signal. This signal is a D.C. signal and may conveniently be generated by switching on a p-n-p transistor having an earthed emitter and a collector catching potential negative with respect to earth. This D.C. signal is fed by an individual cable, lead DM, to an individual amplifier/long distance sending stage in the demand message amplifier DMA. This amplifier may cater for up to three programmers and is used to transmit individual "message demand" signals, in A.C. form, to the allocator unit.

When the "calling" programmer is allocated a channel a select signal is transmitted over lead SL, in A.C. form, to the connection unit at a particular time in the first action btat. This select signal is amplified by the select, reject, redemand circuit SRRT and transmitted in D.C. form over lead SLP to the "calling programmer." The calling programmer is defined at that instant by the SE and SS codes. These codes are derived from the linear PN code (programmers number) generated by the allocator unit. The SE code, sender equipment code, is in multi-linear code form and is used to define the "calling" computer which initially acts as a sender regardless of the ultimate function required. The highway control initially acts as a receiver so that the selected calling programmer may transmit the message order to the highway control unit. The SE code is transmitted, in A.C. form, from the highway control over lead S/R to a receiving terminal/amplifier stage S/RRA which converts the twenty A.C. input signals to a D.C. code. In other words a multi-linear D.C. code output is provided to select the allocated calling programmer. This is required since two programmers within the same group of equipments served by the one connection unit may call at the same instant. The highest priority calling programmer is allocated first and therefore must be selected before the transmission of the message order takes place. The binary SS code signal is also extended at this time over leads BC. The SS code, signal, again in A.C. form, is amplified and converted to D.C. form for distribution to the "calling" programmer by a similar receiving terminal/amplifier stage BCRA as provided for the SE code signal. This SS code defines the store location X, which is the same for all programmers, storing the message order.

The select signal, on lead SLP, allows the production of a "select sender" signal, in D.C. form on leads SLS, from the selected "calling" programmer. This signal is used to gate the message order bits, 36 bits in all and in D.C. form, which are presented as nine sets of four bits each over 36 individual lead DS to the "input switch." The constitution of this switch will be described later. These signals, gated in the input switch IPS by the SLS lead individual to the selected calling programmer, are converted to A.C. form by the amplifier/long distance sending terminals in amplifier LDA and fed in parallel over 36 leads to the highway control unit via the associated convergence circuit under the control of the central clock system in the second action beat period.

The message order is processed by the highway control unit and if the message demand is incompatible "reject" signals or "redemand" signals are transmitted over lead SL, in A.C. form, at specific time slots, under the control of a central clock, to the select, reject, redemand, terminal SRRT which indicates to the calling programmer, in D.C. form, the highway control unit requirement. These signals are acted on by the calling programmer to extend a further demand or to reset the stored message order.

The highway control unit extends the RE, RS, RU, RE and SS codes when the calling programmers message order is checked by the compatibility unit and the "demand established" signal is produced. The SE and SS codes extended at this time may be different from those extended to define the calling programmer as the calling programmer may require to read from the equipment specified in the message order OE code. The direction of the message is established, as previously described, from the direction bit in the LS code. If one of the ten local equipments associated with the particular connection unit is selected as the sender equipment by the SE and SS codes the selected sender equipment is caused to extend the "select sender" signal over lead SLS as described above when the SE and SS codes are used to define the calling programmer. Thus the sender is ready to send the "data" message.

Each bit in the data message is applied, in D.C. form, to individual leads, represented by lead DS, on the input of the input switch IPS. Each "bit" is AND gated with the "select sender" signal. There as 36 input AND gates for each equipment in a connection unit group and these gates carry bits 1 to 36 for each equipment. The outputs of all gates carrying corresponding bits within the data message word (i.e. bit one of all equipments in the group) are commoned together. The commoning is done in "two stages," directly in one group of eight equipments and one group of four equipments and then through an inverter OR gate. The diode OR gates are strobed, by the central clock, through a diode on each of the groups of four and eight equipments. The resulting thirty-six bit or digit leads now carry A.C. signals, to the strobing of the central clock, and these digit signals are amplified in the amplifier/long distance sending terminal LDA. The A.C. digit signals are then applied to the convergence unit on leads DSL for transmission over the highway, or in the case of message order bits, to the highway control unit. At the output of the amplifier/long distance sending terminal LDA the thirty-six data bits are applied, in groups of four, to nine parity generator circuits in the parity bit generator stage DPG. The nine parity bit outputs from this generator stage are amplified and transmitted over the highway with the data bits by means of leads DSLP. The output of each digit amplifier and the output of each parity amplifier is connected to the sets of leads DSL (36 in all) and DSLP (9 in all) via transformer terminated medium power inverter amplifiers.

While the data message is extended over the highway, i.e. in the third or succeeding action beat periods, the RE, RS, and RU codes, extended to all connection units in the system, are being used to select the required receiver. These codes are transmitted over the instruction highway during the order beat period preceding the data message transmission action beat period. The multi-linear RE code selects one of the local equipments associated with the various connection units. Assuming that the RE code selects one of the local equipments associated with the connection unit under discussion the RS code and the RU code if required are used by the selected receiver equipment to prepare it for the reception of the transmitted data. The RE code instructions are of multi-linear form and the same configuration as the SE code, and are transmitted in A.C. form from the divergence unit over instruction highway leads S/R. The binary coded RS and RU instructions, also transmitted over the instruction highway from the divergence units in A.C. form, are received over leads BC. All the above instruction signals, plus parity signals for the binary coded RS and RU instructions, are applied to receiving terminal/amplifier stages BCRA and PBCRA respectively. These stages may conveniently be transformer input stages having two stages of inverting amplification with D.C. restoration. Thus, the A.C. form signals are converted into D.C. form signals for extension to the receiving terminal. The receiving terminal/amplifier stages are provided on an individual basis for each incoming lead thus ten such equipments will be provided for example, for the RS code instruction leads (i.e. eight bit binary code plus two parity bits). The individual sections of the RE code are applied to "linear code checking" circuits LCC in which if more than or less than one bit is indicated in each section of the twenty multi-linear bit code (i.e. check for one out of eight in two sections and one out of four in the fourth), a fault condition is sensed and an output from the linear code checking circuit is given to set a fault staticiser in the fault indicating circuit FI.

The binary coded instructions, RS and RU codes, are checked, when received at the connection unit, by parity checking circuits BPCC. These parity checking circuits consist of parity generators, which generate local parity bits from the received instructions, and comparator circuits, which compare the locally generated parity bits with the relevant data parity bits received over leads PBC. When a "non-equivalence" between these two sets of parity bits is experienced the fault staticiser in the fault indication circuit FI is set. The RE, RS, and RU code instructions are extended over individual sets of leads to all receivers by means of leads REI (RE code) and leads RS/U (RS and RU codes).

When the required receiver has been selected and the various codes to achieve this checked, the receiver equipment is ready to receive the first data message. This is transmitted from the selected sender equipment in the central clock third action beat period. The thirty-six bits in the data message word are transmitted from the divergence unit over leads DRL to 36 individual receiving terminal/amplifier stages in amplifier DRA. These stages are substantially of the same configuration as those used for the RE, RS and RU code instructions. The same procedure is adopted for checking the parity bits, transmitted with the data message over leads DRLP, as that used for the RS and RU code instruction parity checking. The data parity bits are amplified by DRPA and are compared with locally generated parity bits in the data parity checking circuit DPCC. The data is transmitted in D.C. form, over leads DR to all receivers, however, only one receiver will have its input gates in a selected condition and, therefore, only that receiver will receive the transmitted data message.

The fault indicating circuit FI indicates a fault condition, which is fed via fault lead F on the highway to the convergence circuit and thence via the highway control unit to the compatibility unit. A signal is generated in response to this fault signal to stop the message and remove the allocated sender and receiver equipments, by means of a reject signal at a particular time slot on the particular one of leads SL serving the selected programmer, from the allocated highway. The fault staticiser mentioned previously may conveniently consist of a number of toggle circuits which are individually set according to the type of fault (e.g. data parity fail). This staticised information is converted into a logical pattern by the fault pattern logic FPL and transmitted over leads FP to the associated or central compatibility unit to assist in fault location.

*The convergence unit*

Figure 6:
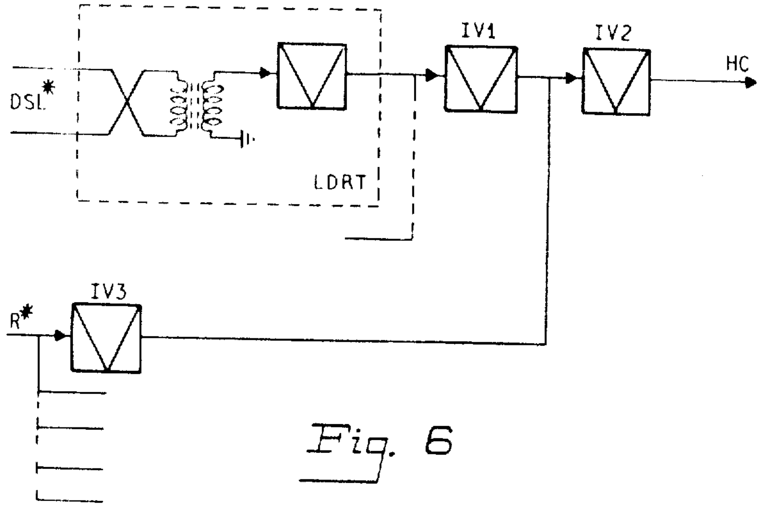
FIG. 6 shows a block schematic diagram of the convergence unit.

This unit is shown, in more diagrammatic form than previous figures, in FIGURE 6 and has the following functions.

(a) To receive data signals from the sender equipment connection unit in A.C. form and to amplify and transmit these signals to the two divergence units.

(b) To provide a point for the elimination of the unwanted data message subsections indicated by the pattern of "ones" in the RU code.

With reference to FIGURE 6 showing one convergence circuit out of twelve sets, serving each connection unit in the system, of thirty-six, one for each bit of a data word, parallel identical paths.

The data message signals are received on one of the twelve sets of input highway conductors leads DSL* from the connection circuit associated with the sender equipment. These data message signals are amplified by the individual long distance receiving terminals such as LDRT shown in FIGURE 6. The outputs from these terminals are connected via a merging point to an output amplifier formed by two inverters IV1 and IV2. The receiving terminals invert the input data signals, thus the required data is in inverted form at the input of the output amplifier stage. The output amplifier stage is common for each corresponding data message or parity bit for each of the twelve connection circuits in the system. Thus, if it assumed that the circuit shown in FIGURE 6 portrays the convergence channel provided for the least significant bit of the data message from a particular connection unit, the input to inverter IV1 is common to all the least significant bit convergence channels for all the connection units in the system (i.e. twelve in all). Two stages are provided in the output amplifier to correctly phase the data message signals ready for transmission to the convergence units.

The "centre" of the output amplifier is fed with the output from inverter IV3. This inverter may conveniently be described as an elimination inverter and is provided to invert the RU code pattern for the control of unwanted subsections. The signal on lead R*, which is one of the leads R from the highway control unit, is distributed to each of the elimination inverters. The signals are in D.C. form and are such that when lead R* is at 0 volt, amendment of the subsection is required and when negative with respect to 0 volt this subsection is unwanted. When the unwanted subsection condition is sensed "ones" are forced into each bit in that subsection by for example the injection of a one condition into the input of inverter IV2 by inverter IV3. The parity bit for that subsection is made "zero" to indicate even parity, as the associated subsection will now contain a 1111 pattern. The data signals are transmitted over the data highway conductors (e.g. HC) to the divergence units.

*The divergence unit*

Figure 7:
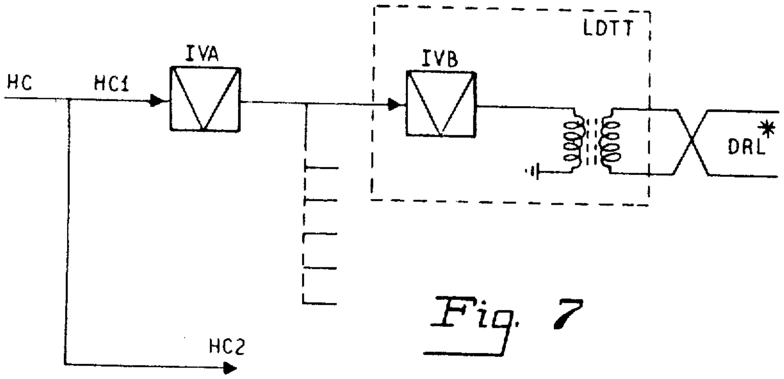
FIG. 7 shows a block schematic diagram of the divergence unit.

This unit is shown in FIGURE 7 and is used to serve six of the twelve connection units. The figure shows the path for one item of data in the data message which is transmitted from the convergence unit over lead HC. Lead HC1 indicates the input to the divergence unit under consideration and lead HC2 indicates the input to the corresponding divergence path in the other divergence unit. Each path consists of an input inverter amplifier IVA which feeds the corresponding path for each of the six connection units via the long distance transmitting terminal LDTT to lead DRL*. Each of the six sets of long distance transmitting terminals drives one connection unit with 122 signals made up as follows: 36 for data pulse, 9 for data parity (from the convergence unit), 20 for the RE code, 10 for the RS code, 20 for the SE code, 10 for the SS code plus 5 for RS and SS code parity (all from the highway control unit leads E, S, E′, S′), 9 for the RU code plus 3 for RU code parity (from highway library via highway control on lead R). Additional long distance transmission circuits are provided for strobe distribution from the allocate unit to the connection units.

*Strobe disrtibution system*

As mentioned previously, in addition to providing equipment for the control and communication facilities of a highway system, the highway equipment units also form a vehicle for conveying the overall synchronisation or "strobe" signals to the various system equipments. Although this strobe distribution system is not a feature of the invention it is included for the sake of completeness.

The strobe distribution system is divided into three main parts:

(a) The central strobe generator. This is located in the highway channel allocator and its outputs connect to long distance transmitting terminals in the divergence units.

(b) The divergence units are connected to delay line circuits in the connection units. These strobe signals are used to set up the group strobe signals (there is effectively one connection unit for each group of twelve equipment units which use the highway system).

(c) The group strobe signal is distributed to each equipment in the group and drives delay lines which are set up for the particular purpose of these equipments.

(d) The central strobe also controls the three highway control units.

The mechanisation of one type of system according to the invention has been described and it will be appreciated that the great advantage of the "highway" system is that it allows many computers (or computer units), called programmers in the specification, to share the use of a common storage pool. At the same time, because it is operated on an "on demand" or random basis, time is not wasted by a programmer waiting for its turn on the highway. In other words programmers normally will only suffer delays in "peak periods" when more demand messages are generated than there are highways in the system.

This creates two distinct advantages: (1) whenever more than one programmer is required for a particular function only one further equipment has to be provided to guarantee 100% grade of service. (2) That more computing capacity can be added to the system as the need for facilities increases.

The invention has been described with reference to thirty computer units and up to ninety other equipment units, however this number allocation is intended to be in no way limiting to the invention and alternative arrangements will readily be appreciated by those skilled in the art.

I claim:

1. A data processing system having a plurality of data processing devices and a plurality of terminal devices arranged for interconnection over a common communication path characterised in that in order to enable interconnection on a mutually exclusive basis between any one of said data processing devices and any one of the remaining devices over said path, each of said devices is identified by a discrete coded number and when one of said data processing devices requires connection to another of said devices, said one data processing device generates a demand signal which is sensed by control equipment associated with said common communication path, said demand signals being of such a form as to indicate to said control equipment the coded number and priority allocation of said demanding data processing device and said control equipment being arranged
- (a) to select the highest priority demanding data processing device
- (b) to set up a temporary connection path from said demanding data processing device to said control equipment over part of said common communication path, said temporary path being used to pass coded information from said demanding data processing device to said control equipment defining the coded number to the wanted device to be used in the connection and the type of data transfer required
- (c) to define the busy or free status of said wanted device and the busy or free status of said common communication path
- (d) to generate selection signals to take into use said wanted device if said device and said common communication path is free
- (e) to set up connections to said common communication path involving the demanding data processing device and said wanted device in accordance with the type of data transfer required.

2. A data processing system as claimed in claim 1, wherein said data processing devices and said terminal devices are divided into groups, a group consisting of at least one data processing device and a plurality of terminal devices, each of said groups being served by a connection unit, said connection unit including two channels, one a reception channel for handling data signals emanating from said common communication path and the other a transmission channel for handling data signals to be passed to said common communication path.

3. A data processing system as claimed in claim 2, wherein one side of the transmission channel of each of the said connection units is connected to one end of said common communication path by way of a convergence unit and one side of the reception channel of each of said connection units is connected to the other end of said common communication path by way of a divergence unit.

4. A data processing system as claimed in claim 3, wherein control signals emanating from said control equipment are active in selected ones of said connection units to define the associated device to be connected to the other sides of the reception and transmission channels of the connection unit.

5. A data processing system as claimed in claim 1, wherein said demand signal consists of the application of a signal to a single lead, the leads from all the data processing devices being connected to the control unit in a particular order according to the priority of the demanding device and the control unit converts the signal into a control signal which in the case of simultaneous demands from a plurality of devices includes the demand conditions of all the demanding devices, a plurality of common communication paths being provided together with additional control arrangements which select for use with one communication path the demanding data processing device having the highest level of priority and which pass the demand conditions with the demand condition relative to the demanding device having the highest priority abstracted on to the control equipment associated with another common communication path.

6. A data processing system as claimed in claim 1, wherein the coded number of the demanding device is converted in said control equipment into control signals which enable a transfer path to be completed including a portion of said communication path, said coded information being presented to said control equipment over said transfer path.

7. A data processing system as claimed in claim 6, wherein said control equipment includes means to which said coded number is presented and which alter the number so that it indicates the location of the coded information in the data processing device, said location being the same for all data processing devices.

8. A data processing system as claimed in claim 1, wherein said coded information includes a code of which the three least significant digits determine the number of required transfers over the common communication path and the whole of the coded information is also used to address a library store from which is obtained information relative to the direction of transmission and part of the instructions necessary to steer the information over the communication path.

9. A data processing system as claimed in claim 1, wherein said coded information include a code which identifies the device with which the demanding data processing device requires to communicate, such code being applied to apparatus containing information relative to the availability and serviceability of all the devices in the system and if the required device is unserviceable, and no standby equipment is available, the apparatus prevents the completion of the connection to the communication path.

10. A data processing system as claimed in claim 9, wherein if the required device is unserviceable and standby equipment is available, said apparatus causes a signal to be transmitted to the control equipment to cause the code therein to be changed to that of the standby equipment.

11. A data processing system as claimed in claim 9, wherein if the required device is in use, said apparatus causes the completion of the connection to the communication path to be delayed if the number of transfer operations still to be performed is less than a predetermined number and causes the connection to be prevented if the number of said transfer operations exceeds said predetermined number.

12. A data processing system as claimed in claim 1, wherein the system operates in the parallel mode and the devices transmit and respond to D.C. signals and the connection units are arranged to convert the outgoing D.C. signals into A.C. signals for transmission to said control equipment and to said communication path and to convert incoming A.C. signals from said control equipment and said communication path to D.C. signals.

13. A data processing system as claimed in claim 1, wherein certain of the coded information are multi-linear and the checking arrangements are operative to provide a fault condition if other than one bit is indicated in each section of the multi-linear code.

14. A data processing system as claimed in claim 1, wherein certain of the coded information are in binary form and include parity bits and the checking arrangements are operative to provide a fault indication in the case of non-equivalence between locally generated parity bits and received parity bits.

15. A data processing system as claimed in claim 14, wherein a fault indication is effective in apparatus which also determines the availability or serviceability of all the devices of the system, said apparatus in responding to a fault indication serving to terminate the transfer of data between sending equipment and receiving equipment and to disconnect such equipment from the communication path.

16. A data processing system as claimed in claim 1, wherein arrangements are provided for forming into a queue in a storage device data messages to be transferred between devices connected by a communication path, said coded information including a code indicating that information is to be inserted in or extracted from the queue.

17. A data processing system as claimed in claim 16, wherein said code is effective in a library store to transfer to the data processing device an indication of the location in the storage device of the head or tail of the queue, this indication being increased or decreased by one accordingly for each transfer operation.

18. A data processing system having a plurality of data processing devices and a plurality of terminal equipments arranged for interconnection over a common communication path characterised in that the data processing devices and the terminal equipments are connected in groups to a plurality of connection units each group including at least one data processing device each connection unit including a receiving channel for receiving data from said common communication path and a transmitting channel for transmitting data to said common communication path and the receiving channels of all the connection units are connected to said common communication path through a divergence unit whereas the transmitting channels of all connection units are connected to said path through a convergence unit, control equipment associated with said path responding to signals applied thereto by a demanding data processing device to selectively effect an exclusive connection over said communication path from the demanding data processing device over one channel of a connection unit, the convergence unit, the communication path, the divergence unit and the other channel of the same or a different connection unit to a desired one of the other data processing devices or terminal equipments.

References Cited

UNITED STATES PATENTS

| | | | |
|---|---|---|---|
| 3,029,414 | 4/1962 | Schrimpf | 340—172.5 |
| 3,079,082 | 2/1963 | Scholten | 235—157 |
| 3,099,818 | 6/1963 | Murray | 340—172.5 |
| 3,200,380 | 8/1965 | MacDonald | 340—172.5 |
| 3,222,647 | 12/1965 | Strachey | 340—172.5 |
| 3,242,467 | 3/1966 | Lamy | 340—172.5 |

ROBERT C. BAILEY, *Primary Examiner.*

I. KAVRUKOV, *Assistant Examiner.*